J. M. ADAMS.
JOINT FOR METAL BEDS.
APPLICATION FILED JAN. 8, 1909.
933,355.
Patented Sept. 7, 1909.
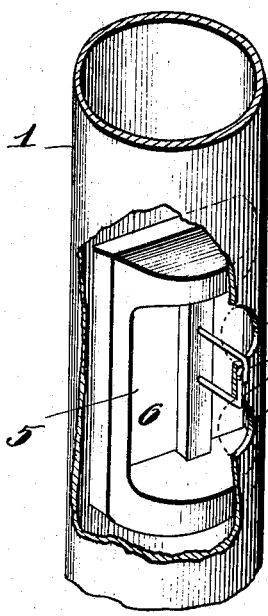
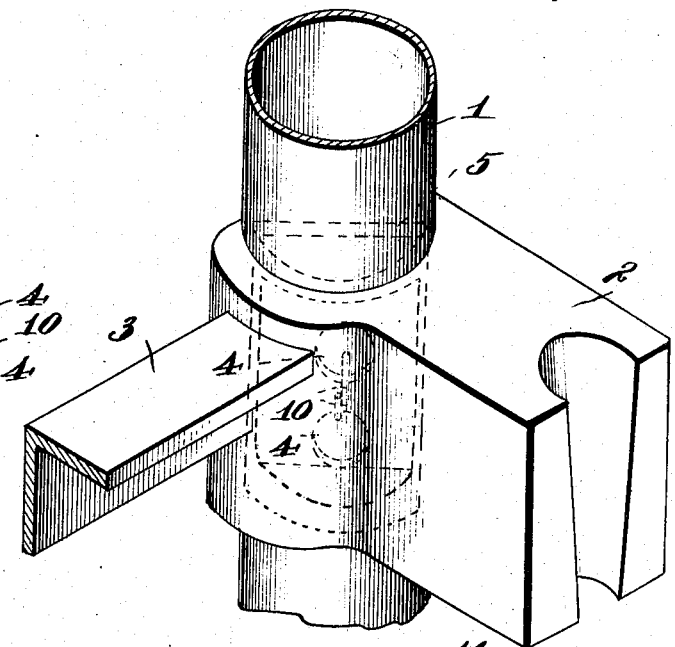
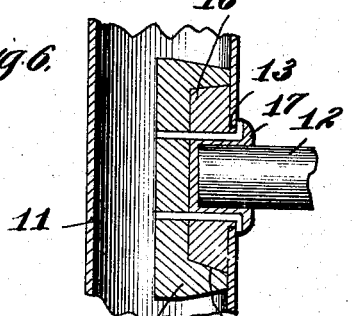
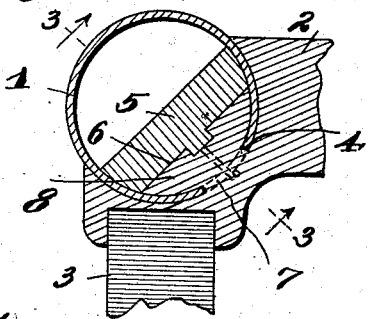
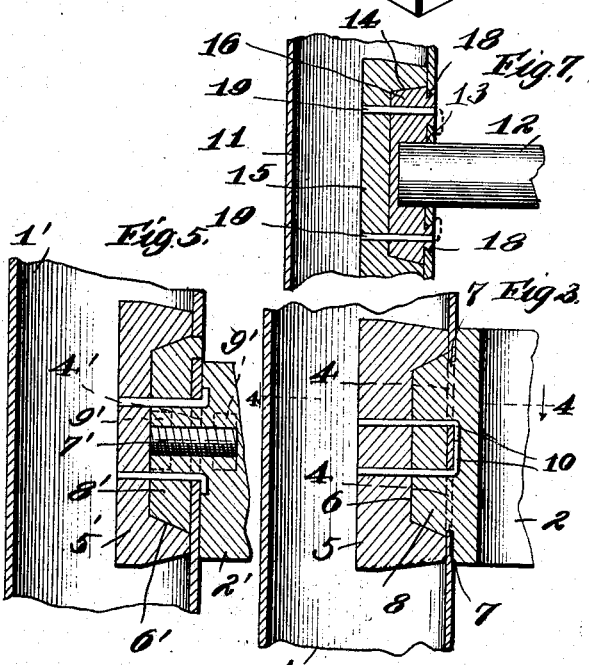
Witnesses:
Inventor:
John M. Adams,

UNITED STATES PATENT OFFICE.

JOHN M. ADAMS, OF CHICAGO, ILLINOIS.

JOINT FOR METAL BEDS.

933,355.  Specification of Letters Patent.  Patented Sept. 7, 1909.

Application filed January 8, 1909. Serial No. 471,226.

*To all whom it may concern:*

Be it known that I, JOHN M. ADAMS, a citizen of the United States, and a resident of Chicago, in the county of Cook and State of Illinois, have invented certain new and useful Improvements in Joints for Metal Beds, of which the following is a specification.

This invention relates to metal bedsteads and relates particularly to joints for connecting different members of metal bedsteads, as corner fastenings to the hollow posts thereof and various members to one another, of the general type comprising a hollow member provided with a hole or opening through which extends a part of a projection on the other member to be connected thereto, and an abutment cast with or upon the part of or projection on said second member within said first hollow member, said abutment being larger than the hole or opening in said hollow member and engaging the inner surface thereof beyond the edges of the hole or opening therein.

A primary object of the present invention is to simplify and cheapen the construction of joints of this general type.

A further object of the invention is to provide a joint of this type in which there is no engagement between the abutment or the member on which it is cast with the exterior surface of the hollow member to which said second member is connected, constructed and arranged to prevent endwise play or "shucking" of the abutment and the member on which it is cast relatively to the hollow member to which it is connected.

To effect these objects, my improved joint comprises a hollow member provided with a hole or opening, a mold plate shaped to form a closed recess within said hollow member into which the hole or opening in the side of said hollow member opens, means for rigidly securing said mold plate in position, a part of or a projection on the other connected member which extends through the hole or opening in said tubular member into the recess or cavity defined by said mold plate and an abutment cast with or upon said part of or projection on said second connected member within said recess or cavity. Preferably, also, the means for securing said mold plate in position are so constructed and arranged that by the operation of casting said abutment, said mold plate becomes a constituent part of the joint. Specifically, as shown, the means for securing said mold plate in position consist of clips secured thereto, the ends of which are bent over the outer edges of the hole or opening in the hollow member, whereby they will be embedded in the abutment when the same is cast.

The invention also consists of the various other features and details of construction hereinafter described and claimed.

In the accompanying drawing, in which my invention is fully illustrated—Figure 1 is a perspective view of a bed post and a corner fastening cast thereon and connected thereto by means of a joint of my invention, the mold plate on the inside of the bed post and the securing means therefor being shown in dotted lines. Fig. 2 is a perspective view of a bed post and of a mold plate secured inside thereof preparatory to forming a joint of my invention, the post being partly broken away to expose said mold plate. Fig. 3 is a vertical, sectional view taken substantially on the line 3—3 of Fig. 4. Fig. 4 is a transverse sectional view on the line 4—4 of Fig. 3. Fig. 5 is a sectional view, similar to Fig. 3, in which the projection on the corner fastening, or other connected member, which extends through the hole or opening in said hollow member into the recess or cavity therein, consists of a separate stud cast into said corner fastening. Fig. 6 is a sectional view, substantially similar to Fig. 3, showing the application of my improved joint for connecting the end of a rod or tube to a bed post, or the like; and Fig. 7 is a sectional view, substantially similar to Fig. 4, showing my improved joint as applied for connecting a rod or tube to a hollow bed post or the like, the rod or tube being of the same size as the hole or opening in said hollow member.

Referring now particularly to Figs. 1 to 4 of the drawings, 1 designates a post of a metal bedstead, 2 a corner fastening member secured thereto, and 3 an end rail of the bedstead, the end thereof being embedded in the corner fastening member 2.

The post 1 is hollow and is provided in its side with one or more, preferably two, holes or openings 4. Secured within the post 1 is, what, for purposes of convenient reference, may be termed a mold plate 5, which contacts with the inner surface of said post around and at a distance from the holes or openings 4 and which is shaped to form a closed recess or cavity 6 into which said holes or openings 4 open. Studs 7 on the corner fastening 2 extend through the holes or openings 4 and project into the recess or cavity 6 defined by the mold plate 5 and are secured therein by a cast abutment 8 cast with or upon the studs 7 within the recess or cavity 6.

In the construction shown, the studs 7 and abutments 8 are cast integral with the corner fastening member 2, but my invention contemplates equally, as an equivalent, the use of separate studs cast into said corner fastening member and a separate abutment 8 cast in the recess or cavity and upon the ends of said separate studs which project into said recess or cavity. With this construction the studs are preferably provided with heads, screw threads, or the like, to insure a strong connection between said studs and the corner fastening member and the abutment. This modification is illustrated in Fig. 5 of the drawings, in which $1^1$ designates the bed post, $2^1$ the corner fastening member $4^1$ a hole in the post $1^1$, $5^1$ the mold plate, $6^1$ the recess or cavity within the post defined by said mold plate, $7^1$ a separate screw-threaded stud and $8^1$ the abutment cast into the recess or cavity $6^1$, said stud $7^1$ being embedded in said corner fastening member outside of said post and in the abutment $8^1$ within said post. As stated, heads, indicated in dotted lines at $9^1$, may be used instead of screw threads to provide a strong connection between said stud and said corner fastening member or said abutment, either or both. Where heads $9^1$ are used, they will have to be of such size that they will pass through the holes or openings $4^1$.

The mold plate 5, may be cast from any suitable metal, as chilled cast iron, or may be stamped from sheet steel or the like. Preparatory to inserting the studs 7 and casting the abutment 8, said mold plate is secured in position by independent connection with the post 1, preferably in such manner that when the abutment 8 is cast, said securing means will become embedded in said abutment, thereby permanently securing said mold plate in position and rendering said mold plate a constituent part of the joint. In the preferable construction shown, said mold plate is secured in position by clips or wires 10, rigidly secured thereto, being preferably embedded directly therein where said mold plate is made of cast metal, the free ends of said clips or wires being turned or clenched over the outer edges of the holes or openings 4. With the described construction, it is obvious that, when the abutment 8 is cast, said clips or wires 10 will be embedded therein, thereby binding all of the parts together into a practically unitary structure.

At the present time there is a considerable demand for bedsteads of very plain and severe appearance, in which the usual "chills" heretofore commonly used for connecting the members of the head and the foot of the bedstead to one another are dispensed with. This can be effected in a simple and effective manner by the use of my improved joint and in Fig. 6 of the drawings I have shown my improved joint as applied for thus connecting the members or elements of the head or foot of a bedstead. Referring now to said Fig. 6, 11 designates a hollow member of a bedstead, as the top or bottom tube forming the framework of the head or foot thereof, and 12 one of the upright rods which extend between said hollow members and the ends of which are connected thereto. In accordance with my invention, said rod 12 is connected to the hollow member 11 in the following manner:—Formed in the side of said hollow member 11 is a hole or opening 13, through which the end of the rod 12 is inserted so that it projects into a recess or cavity 14 formed by the mold plate 15 and is secured therein by an abutment 16 cast into the recess or cavity 14 and upon the end of said rod 12. As in the form of the joint heretofore described, the mold plate 15 is secured in position preparatory to casting the abutment 16, by suitable wires or clips which pass through suitable holes or openings formed in the member 11 and bent over the edges thereof. Where the hole or opening 13 is made larger than the rod 12, as when it is desired to form a bead around said joint, as shown at 17 in the drawing, the clips or wires 18 may extend through said hole or opening and be bent over the edge thereof and the metal for forming the abutment may likewise be run through said hole or opening around the rod 12. When, however, it is desired to make a perfectly plain joint and the hole or opening 13 is made the same size as the rod 12, it will be impossible to pass said clips or wires through said holes or to pour the metal for forming said abutment therethrough. Pouring gates are accordingly made in the member 11 at each side of the hole or opening 13, as indicated at 18, Fig. 7, and the clips or wires 19 are drawn through and turned or clenched over the edges of these holes or openings. After the abutment has been formed the spuds of metal which project through said pouring holes and also the projecting ends of said clips or wires are dressed off flush with the surface of the member 11, thus making a perfectly plain joint, as desired. To hold the abutment 16 in place after said spuds have been dressed off, and with it the mold plate 15, thereby preventing the rod 12 from shoving through the hole or opening 13, the pouring gates or holes 18 are preferably countersunk from the outside, whereby a dovetail connection will be formed between said abutment and the member 11.

I claim:—

1. A joint for a metal bed or the like, comprising a hollow member provided with a hole or opening, a mold plate within said hollow member, said mold plate only partially filling the bore of said hollow member and separate means applied to said mold plate for securing said mold plate in position within said hollow member, said mold plate being shaped to form a recess or cavity within said hollow member into which the opening in said hollow member opens, a part of or projection on the other connected member which extends through the opening in said hollow member into the recess or cavity defined by said mold plate and an abutment within said recess or cavity cast with or upon said part of or projection on said second connected member which projects into the cavity defined by said mold plate, substantially as described.

2. A joint for a metal bed or the like, comprising a hollow member provided with a hole or opening, a mold plate within said hollow member, said mold plate only partially filling the bore of said hollow member and separate means applied to said mold plate for securing said mold plate in position within said hollow member, said mold plate being shaped to form a recess or cavity within said hollow member into which the opening in said hollow member opens, a part of or projection on the other connected member which extends through the opening in said hollow member into the recess or cavity defined by said mold plate and an abutment within said recess or cavity cast with or upon said part of or projection on said second connected member which projects into the cavity defined by said mold plate, the means for so securing said mold plate in position preparatory to forming said joint being constructed and arranged to coöperate with the abutment when cast to rigidly connect said abutment to the hollow member, substantially as described.

3. A joint for a metal bed or the like, comprising a hollow member provided with a hole or opening, a mold plate within said hollow member, said mold plate only partially filling the bore of said hollow member and separate means applied to said mold plate for securing said mold plate in position within said hollow member, said mold plate being shaped to form a recess or cavity within said hollow member into which the opening in said hollow member opens, a part of or projection on the other connected member which extends through the opening in said hollow member into the recess or cavity defined by said mold plate and an abutment within said recess or cavity cast with or upon said part of or projection on said second connected member which projects into the cavity defined by said mold plate, the means for so securing said mold plate in position preparatory to forming said joint being constructed and arranged to coöperate with the abutment when cast to rigidly connect said mold-plate to said abutment and said abutment to the hollow member, substantially as described.

4. A joint for a metal bed or the like, comprising a hollow member provided with a hole or opening, a mold plate, means for securing said mold plate within said hollow member, said mold plate being shaped to form a recess or cavity within said hollow member into which the opening in said hollow member opens, the means for so securing said mold plate in position comprising clips secured to said mold plate which extend across the recess or cavity defined by said mold plate and which are turned or clenched over the outer edges of a hole or holes formed in said hollow member, a part of or projection on the other connected member which extends through the hole or opening in said hollow member into the recess or cavity defined by said mold plate, and an abutment cast within said recess or cavity, with or upon said part of or projection on said second connected member which projects into the cavity or recess defined by said mold plate, whereby the clips which secure said mold plate to the hollow member will be embedded in said cast abutment, substantially as described.

5. A joint for a metal bed or the like, comprising a hollow member, a mold plate, means for securing said mold plate within said hollow member, said mold plate being shaped to form a recess or cavity within said hollow member and said hollow member being provided with a hole or opening adapted to receive a part of or projection on the member designed to be connected to said hollow member and with a pouring hole or holes, all of said holes or openings opening into the cavity defined by said mold plate, means for securing said mold plate in position comprising clips secured to said mold plate which extend across the recess or cavity defined by said mold plate and which are turned or clenched over the outer edges of the pouring hole or holes in said hollow member, and an abutment cast within said recess or cavity, with or upon said art of or projection on said second connected member which projects into the cavity or recess defined by said mold plate, whereby the clips which secure said mold plate to the hollow member will be embedded in said cast abutment, substantially as described.

6. A joint for a metal bed or the like, comprising a hollow member, a mold plate, means for securing said mold plate within said hollow member, said mold plate being shaped to form a recess or cavity within said hollow member and said hollow member being provided with a hole or opening adapted to receive a part of or projection on the member designed to be connected to said hollow member and with a pouring hole or holes, all of said holes or openings opening into the cavity defined by said mold plate, means for securing said mold plate in position comprising clips secured to said mold plate which extend across the recess or cavity defined by said mold plate and which are turned or clenched over the outer edges of the pouring hole or holes in said hollow member, and an abutment cast within said recess or cavity, with or upon said part of or projection on said second connected member which projects into the cavity or recess defined by said mold plate, whereby the clips which secure said mold plate to the hollow member will be embedded in said cast abutment, and the pouring hole or holes for casting said abutment being countersunk at their outer sides, whereby a dovetail connection will be formed between said abutment and the hollow member, substantially as described.

In testimony that I claim the foregoing as my invention, I affix my signature in presence of two subscribing witnesses, this 4th day of January, 1909.

JOHN M. ADAMS.

Witnesses:
C. B. CARTER,
K. A. COSTELLO.